Figure 1:
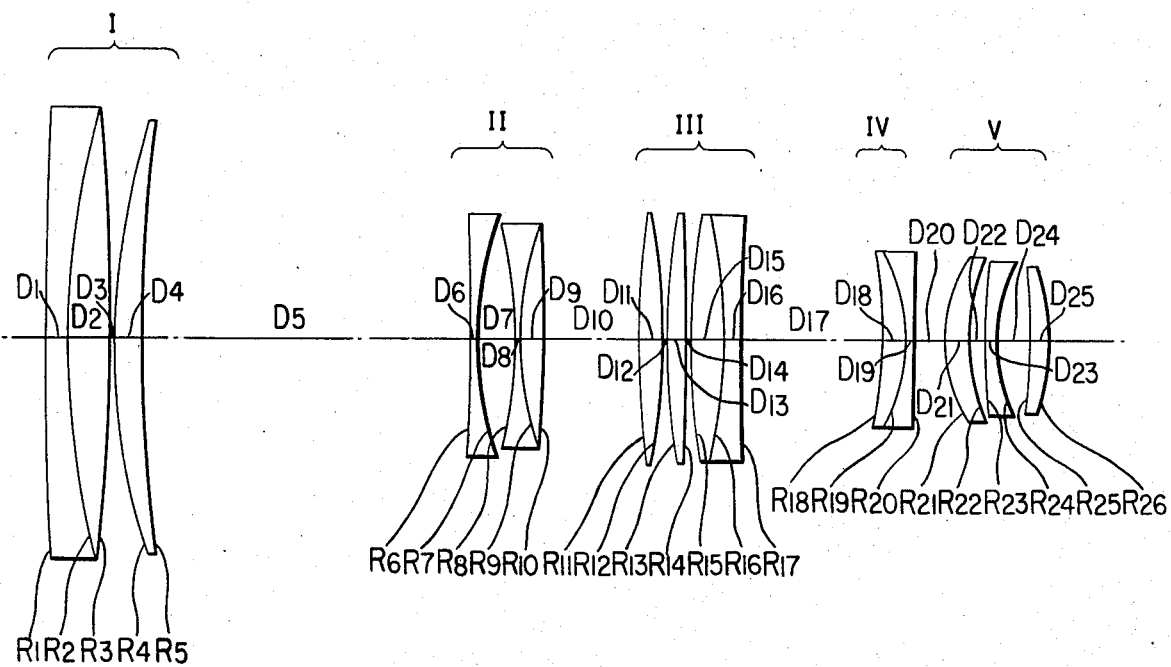

United States Patent
Tsuji

[11] 3,970,367
[45] July 20, 1976

[54] ZOOM LENS SYSTEM
[75] Inventor: Sadahiko Tsuji, Yokohama, Japan
[73] Assignee: Canon Kabushiki Kaisha, Tokyo, Japan
[22] Filed: Jan. 23, 1975
[21] Appl. No.: 543,276

Related U.S. Application Data
[63] Continuation of Ser. No. 372,000, June 21, 1973.

[30] Foreign Application Priority Data
July 20, 1972 Japan................................ 47-12514

[52] U.S. Cl. ............................................... 350/184
[51] Int. Cl.² .................... G02B 15/16; G02B 15/18
[58] Field of Search .............................. 350/184, 186

[56] References Cited
UNITED STATES PATENTS
3,507,555  4/1970  Isshiki .............................. 350/184
3,615,125  10/1971  Higuchi et al. ..................... 350/184

*Primary Examiner*—Paul A. Sacher
*Attorney, Agent, or Firm*—Toren, McGeady and Stanger

[57] ABSTRACT

A zoom lens system comprising five lens groups of which the first, third and fifth groups are convergent, the second group is divergent, and the fourth group is a divergent doublet consisting of convergent and divergent elements cemented together, the cemented contact surface being concave toward the front, in which the second group is axially movable to effect magnification variation, and the third group is axially movable forward and then rearward when zooming the second group from an extreme focal length range to the other, said zoom lens system being characterized by the following relationships in combination:

$$0.6 f_w < -f_2 < 0.8 f_w \qquad 1.$$

$$0.8(-f_2 + \frac{\sqrt{1/M}}{1+\sqrt{1/M}} e_{23}) < f_3 \leq (-f_2 + \frac{\sqrt{1/M}}{1+\sqrt{1/M}} e_{23}) \qquad 2.$$

$$15 < V_{4convex} - V_{4concave} \qquad 3.$$

$$0.01 < N_{4concave} - N_{4convex} < 0.08 \qquad 4.$$

$$0.03 f_w < -R_{4B} < 0.4 f_w \qquad 5.$$

$$f_{45} < 0 \qquad 6.$$

wherein $f_w$ is the shortest focal length; $f_T$ is the longest focal length; M is the magnification ratio $(f_T/f_w)$; $f_i$ is the focal length of the $i$-th group; $f_{45}$ is the overall focal length of the fourth and fifth groups; $e_{23}$ is the minimum principal point interval between the second and third groups; $R_{4B}$ is the radius of curvature of the cemented contact surface in the fourth group; $V_{4convex}$ is the Abbe number of the convex lens in the fourth group; $V_{4concave}$ is the Abbe number of the concave lens in the fourth group; $N_{4convex}$ is the refractive index (for spectral $d$ line) of the convex lens in the fourth group; and $N_{4concave}$ is the refractive index (for spectral $d$ line) of the concave lens in the fourth group.

4 Claims, 19 Drawing Figures

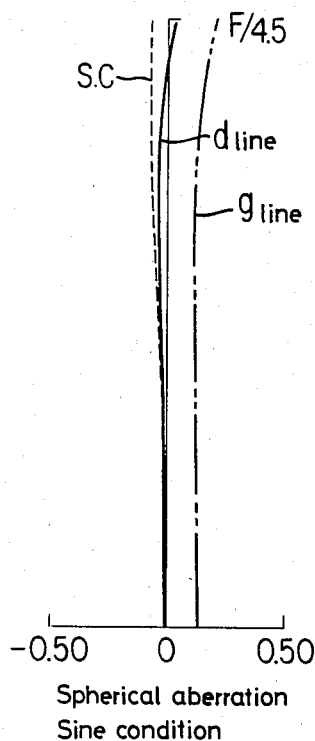
FIG. 2A1
Spherical aberration
Sine condition
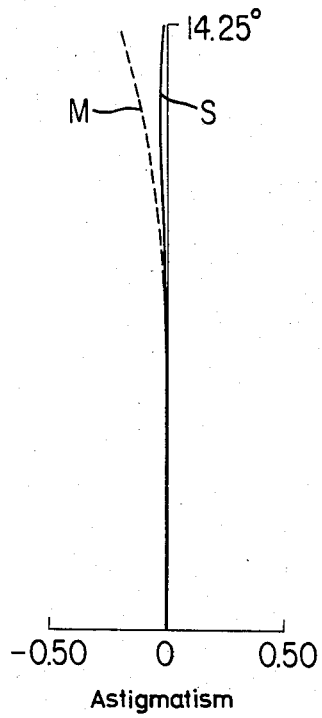
FIG. 2A2
Astigmatism
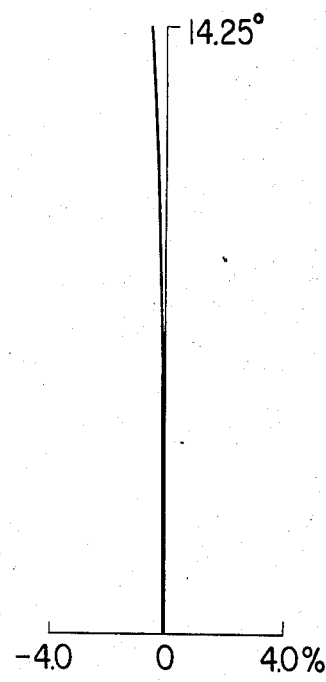
FIG. 2A3
Distortion
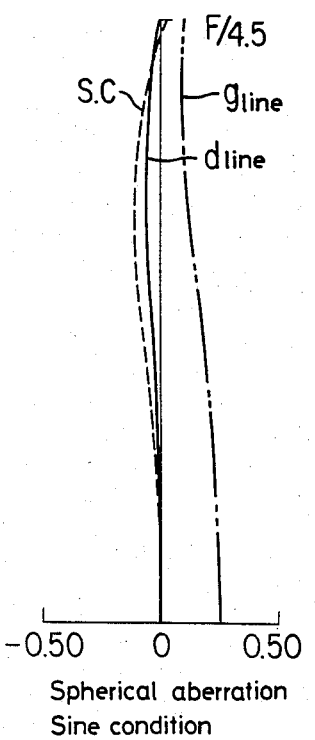
FIG. 2B1
Spherical aberration
Sine condition
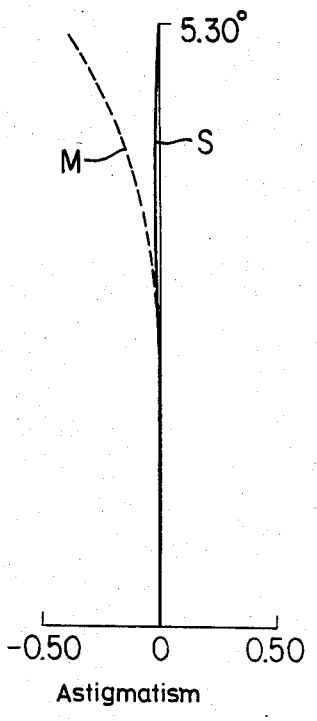
FIG. 2B2
Astigmatism
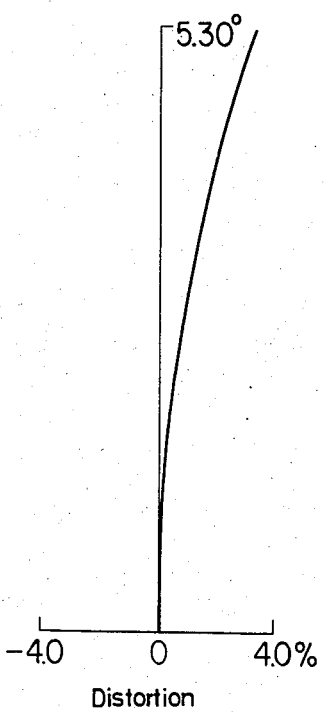
FIG. 2B3
Distortion

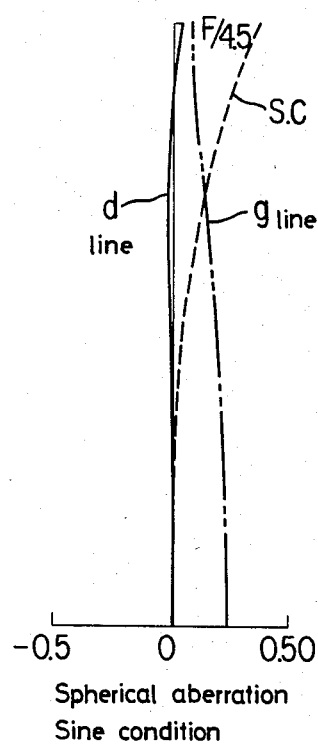
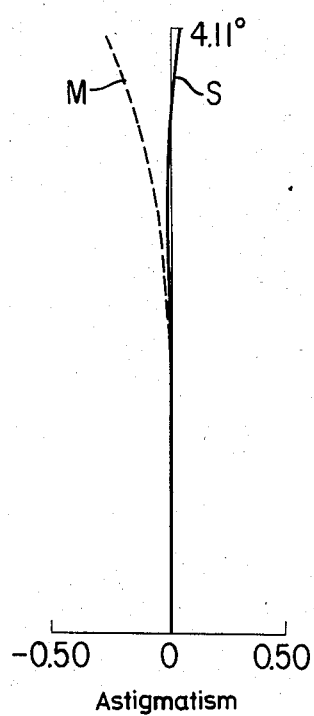
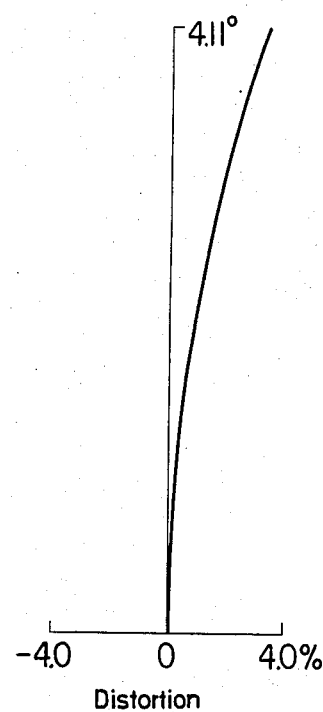
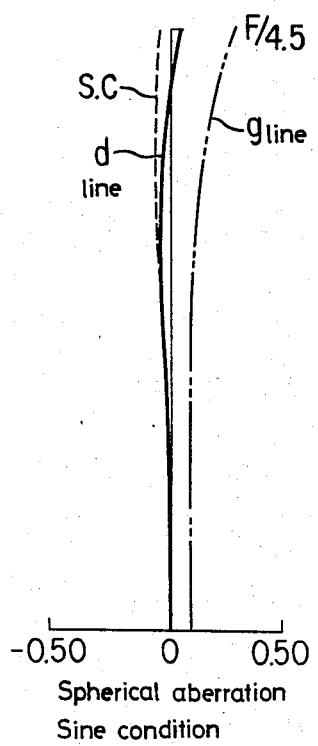
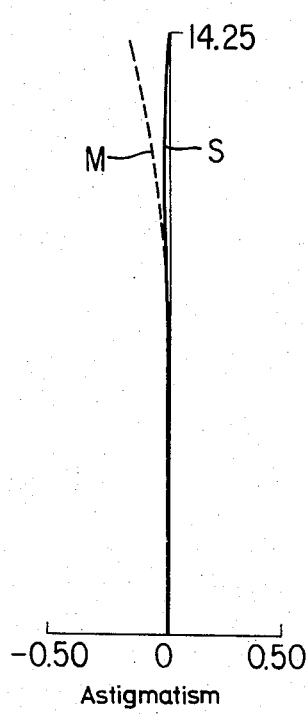
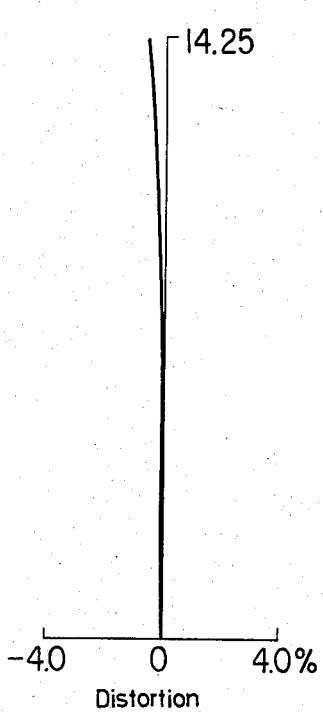

FIG. 3B1
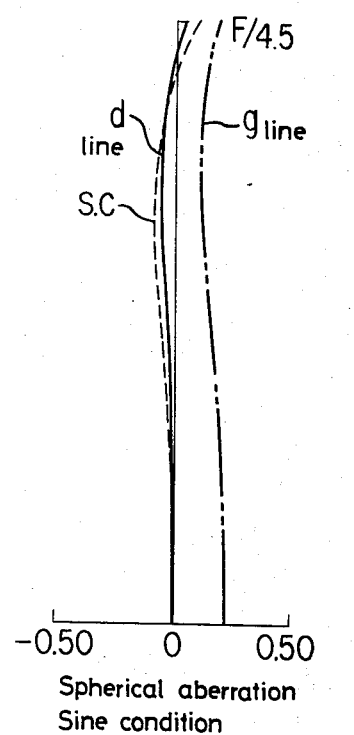
Spherical aberration
Sine condition
FIG. 3B2
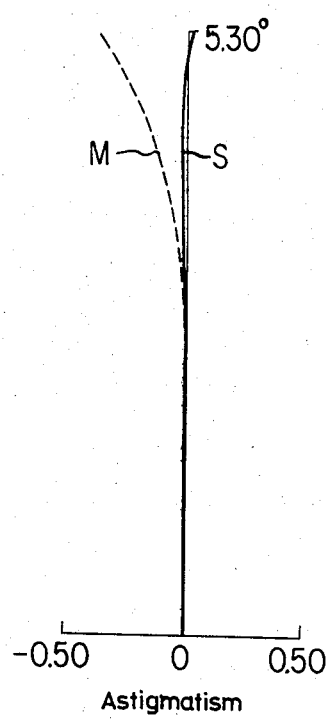
Astigmatism
FIG. 3B3
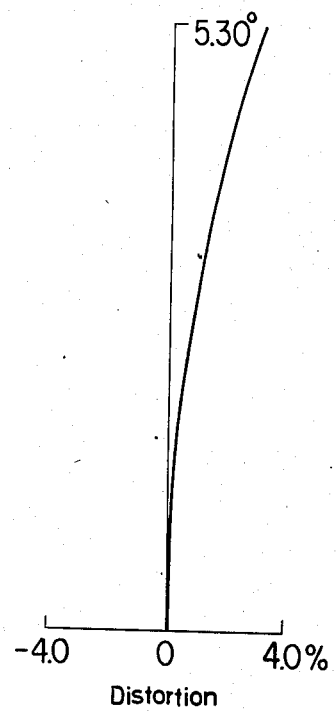
Distortion
FIG. 3C1
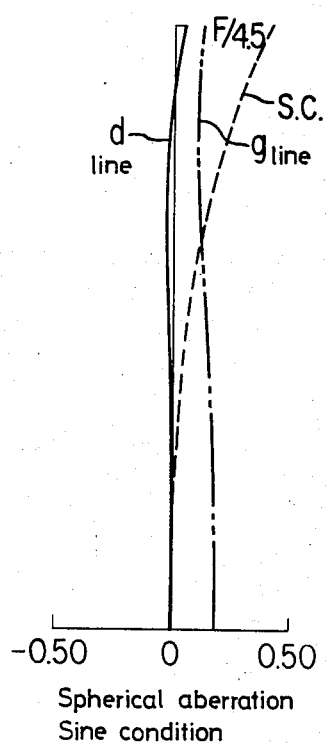
Spherical aberration
Sine condition
FIG. 3C2
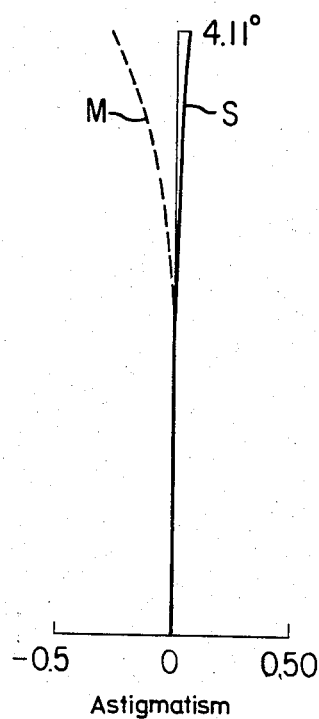
Astigmatism
FIG. 3C3
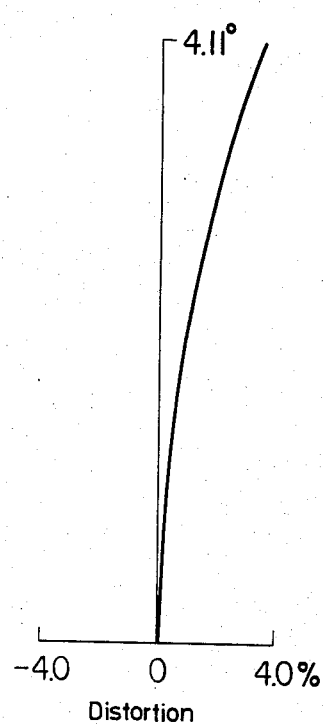
Distortion

ZOOM LENS SYSTEM

This is a continuation of application Ser. No. 372,000 filed June 21, 1973.

This invention relates to a zoom lens system usable with a common type still camera of which the variable focal length is larger than the focal lengths of normal standard objectives, and in particular to a zoom objective with a high relative aperture and a large varifocal range and that in a compact structure. Generally speaking, telephoto objectives for use with still cameras have to be minimized in the complexity, size and weight even in the case of those having fixed focal length. The present invention has for a general object to provide a zoom objective with a high relative aperture and a large magnification ratio while nevertheless the total length of the complete objective (the distance from the front vertex to the focal plane) is shorter than the longest focal length thereof. By comparison with a zoom objective for use with a movie camera of compact design, it is well known that the weight and bulk of a complete zoom objective usable with a still camera is kept in more severely specified proportions relative to the size of the picture frame. Therefore, the refractive power of each component of the zoom control member should be increased inasmuch as the distribution of refractive power is appropriately dimensioned, or otherwise correction of various aberrations is made difficult, and residual aberration variation is increased. The present invention which defines an appropriate distribution of power for the zoom control member to achieve a high standard of aberration correction and general stability of the various aberrations throughout the zooming range, gives rise to the possibility of constructing a zoom objective in respect of increasing the magnification ratio to as much as 3.5 and minimizing the size thereof to such an extent as the telephoto ratio is 0.9 at a relative aperture of 1:4.5, whereby to improve significantly over usual telephoto objectives with respect to compact design.

According to first features of this invention, a zoom objective comprises five lens groups of which the first, third and fifth groups are convergent, the second group is divergent, and the fourth group is a divergent doublet consisting of convergent and divergent elements cemented together, the cemented contact surface being concave to the front, in which the second lens group is axially movable to effect magnification variation and the third group is movable forward and then rearward when zooming the second group from an extreme focal length range to the other, said zoom lens system being characterized by the following relationships in combination:

$$0.6 f_w < -f_2 < 0.8 f_w \quad \quad 1.$$

$$0.8(-f_2 + \frac{\sqrt{1/M}}{1 + \sqrt{1/M}} e_{23}) < f_3 \leq (f_2 + \frac{\sqrt{1/M}}{1 + \sqrt{1/M}} e_{23}) \quad 2.$$

$$15 < V_{4\ concave} - V_{4\ convex} \quad 3.$$
$$0.01 < N_{4\ concave} - N_{4\ convex} < 0.08 \quad 4.$$
$$0.3 f_w < -R_{4B} < 0.4 f_w \quad 5.$$
$$f_{45} < 0 \quad 6.$$

wherein
$f_w$: The shortest focal length
$f_T$: The longest focal length
$M$: The magnification ratio ($f_T/f_w$)
$f_i$: The focal length of the $i$-th group
$f_{45}$: The overall focal length of the fourth and fifth groups
$e_{23}$: The minimum principal point interval between the second and third groups
$R_{4B}$: The radius of curvature of the cemented contact surface in the fourth group
$V_{4\ convex}$: The Abbe number of the convex lens in the fourth group
$V_{4\ concave}$: The Abbe number of the concave lens in the fourth group
$N_{4\ convex}$: The refractive index (for $d$ line of spectrum) of the convex lens in the fourth group
$N_{4\ concave}$: The refractive index (for $d$ line of spectrum) of the concave lens in the fourth group As far as the first features are concerned, condition (1) determines the size of the complete zoom objective. For minimization in size of a complete objective in question, the second lens group for zooming may preferably have an increased refractive power. However, the second group is widely position-variable, thereby to make residual aberrations remarkably perceptible, so that the weaker the refractive power is, the more advantageous for stabilization of aberrations with zooming. Condition (1) provides a compromise stabilization of aberrations and minimization in the size of the complete objective. When the upper limit is violated, the object of providing a zoom objective of compact structure cannot be accomplished, while when the lower limit is violated, suitable correction of aberrations is made difficult.

Condition (2) defines the limits for a compact lens system design as far as zoom lenses of the above-specified lens arrangement are concerned. Subject to the limitations, the straight movement of the second group is compatible with the tracking movement of the third group during zooming. Moreover, in this case, a common space between the space through which the second group is displaceable and the space through which the third group is displaceable is permissible without causing any mechanical interference between the second and third groups at larger magnification positions, thereby to give an advantage of minimizing the size of the complete objective. Further, it is apparent from the formula for avoidance of the mechanical interference between the second and third groups, $$f_3 \leq (-f_2 + \frac{\sqrt{1/M}}{1 + \sqrt{1/M}} e_{23})$$

that when the equal sign is valid, the refractive power of the third group is the smallest, and aberrations ascribable thereto can be advantageously balanced out. Thus the upper limit of condition (2) defines a permissible limit of compatibility of the minimization of the size of the complete objective with the best stabilization of abarrations in an intermediate range of focal length positions. When the lower limit is violated, the variation of residual spherical aberration is objectionably increased so that a high standard of aberration correction cannot be effected, although the size of the complete objective may be furthermore minimized.

Conditions (3), (4) and (5) are concerned with design parameters of the fourth group assisting the achievement of effective compensation for aberrations of the entire system. By holding all of the parameters within the specified values, spherical aberration difference due to color are largely reduced at the cemented contact surface of the fourth group to achieve the so-called spheroachromatism. Of these conditions, condition (3) is essential for the achievement of achromatism of the fourth lens group under condition (4). When the limit of condition (3) is violated, an insufficient achromatism is effected with the result that the condition for separate achromatism is not fulfilled, so that on-axis chromatic aberration and lateral chromatic aberration cannot be corrected without great difficulties while still balancing them. Condition (4) controls the concentration of spherical aberration correction at the cemented surface of the fourth lens group. When the upper limit is violated, over-compensated spherical aberrations result which are too large to be balanced out by the designs of the fifth lens group, thus aberration correction cannot be distributed appropriately over the entire lens system. When the lower limit is violated, the refractive power of the cemented surface is too weak to concentrate appropriately the correction of residual spherical aberration, so that the cemented surface acts merely as a chromatic surface. Condition (5) facilitates the achievement of spheroachromatism with the construction of such a doublet as made of materials having lens parameters selected according to Conditions (3) and (4). These materials are sufficiently dispersive for the normal wave length light, effecting due compensation for residual spherical aberrations, but the dispersibilities for light of rays with shorter wave lengths are weak as compared with those for the normal wave length light. For the prevention of residual spherical aberrations from being over-compensated with respect to light of rays with shorter wave lengths, therefore, the radius of curvature $R_{4B}$ is preferably held within the limitations of condition (5). When the upper limit is violated, a remarkably excess compensation of residual spherical aberrations results with respect to light having shorter wave lengths. When the lower limit is violated, aberrations of high order ascribable to this surface are increased, thereby the state of correction of the image aberrations is deteriorated. Astigmatism and distortion are not affected by the fourth lens group so long as the diaphragm is stationary and located just in front of, or immediately behind the fourth lens group.

Condition (6) assists the shortening of the total length of the complete objective. The requirement that the overall focal length of the fourth and fifth group is negative has a meaning that the overall focal length of the first to third groups is shorter than the focal length of the entire system. Therefore, if the first to third lens groups constituting a zoom member may conveniently considered to be a front assembly, and the fourth and fifth lens groups constituting a relay member to be a rear assembly, it will be understood that the lens system in question is of the telephoto type. Thus a zoom objective having a shortened total length has clearly been designed.

Whilst the above-specified features are generally applicable to any zoom lens with a high relative aperture and a large magnification ratio and that in a compact structure adapted for use with a still camera, it will be appreciated that within the frame-work of the lens system of the invention provided by said features, a furthermore improvement of correction of the image aberrations is effected by the provision of the following further conditions as second features.

The second features of the invention will be explained with reference to the accompanying drawings, in which:

FIG. 1 is a diagram of one embodiment of the zoom objective of the invention.

FIGS. 2A1, 2A2, 2A3, 2B1, 2B2, 2B3, 2C1, 2C2, and 2C3 are curves in Example 1 of the embodiment illustrated in FIG. 1 at the minimum, medium and the maximum focal length positions respectively.

FIGS. 3A1, 3A2, 3A3, 3B1, 3B2, 3B3, 3C1, 3C2, and 3C3 are aberration curves in Example 2 at the minimum, medium and the maximum focal length positions respectively.

Referring to FIG. 1, the zoom objective consists of five lens groups, of which Group I consists of a positive doublet of positive and negative elements cemented together and a positive meniscus singlet, the cemented contact surface being convex to the front, Group II consists of a negative singlet and a negative doublet of negative and positive elements cemented together, the cemented surface being convex to the front and the strong concave surfaces of the both components facing each other, Group III consists successively of two double convex singlets and a positive doublet of positive and negative elements cemented together, the cemented surface being concave to the front, Group IV is a negative doublet of positive and negative elements cemented together, the cemented surface being concave to the front, Group V consists successively of a positive meniscus singlet with the front convex surface, a negative meniscus singlet with the front convex surface and a positive meniscus singlet with front concave surface, in which Group I is axially movable for focusing, Group II is axially movable to effect magnification variation and Group III is axially movable to maintain the image plane constant, Group II and Group III simultaneously moving in such a relationship that a zoom movement of Group II from an extreme focal length range to the other associated with a forward followed by rearward movement of Group III, said zoom objective satisfying the before-mentioned Conditions (1) - (6), and in addition satisfying the following conditions:

a. $20 < V_{1\ convex} - V_{1\ concave}$
b. $1.55 < N_{1\ convex} < 1.7$ .
c. $20 < V_{2\ concave} - V_{2\ convex}$
d. $1.65 < N_{2\ concave}$
e. $20 < V_{3\ convex} - V_{3\ concave}$
f. $N_{5\ convex} < 1.65$ wherein $V_{i\ convex}$ : The average Abbe number of materials of the convex lens elements in the $i$-th group
$V_{i\ concave}$ : The average Abbe number of materials of the concave lens elements in the $i$-th group
$N_{i\ convex}$ : The mean refractive index of materials of the convex lens elements in the $i$-th group
$N_{i\ concave}$ : The mean refractive index of materials of the concave lens elements in the $i$-th group In Group I, chromatic aberration correction is achieved and occurrence of aberrations of higher order is prevented provided that conditions (a) and (b) are simultaneously satisfied. When the upper limit of condition (a) is violated, the radius of curvature of the cemented surface which satisfies the condition for achromatism should be strengthened, as a result of which some aberrations of higher order occur. Moreover, the axial thickness of each convex lens should be increased in order to secure its edge thickness, thereby to reduce the advantage of minimizing the size and weight of the complete objective.

Condition (b) makes intrinsic aberrations of Group I appropriate. As far as the basic design of zoom lenses is concerned, design parameters of each constructional group of elements are held within values specified so as to provide for certain finite aberrations, and the aberrations are balanced throughout the entire zooming range. In case the quantity of intrinsic aberrations is equivalent, the higher the mean refractive index of the convergent lens elements and accordingly the weaker the radius of curvature of each refracting surface are, the smaller the quantity of aberrations of higher order is. Under such circumference, condition (b) prevents the occurrence of aberrations of higher order of Group I, so that when the lower limit is violated, the aberrations of higher order is increased objectionably. On the other hand, when the mean refractive index of the positive elements exceeds the upper limit, Petzval sum is decreased so that curvature of field is apt to be overcorrected. Such a tendency is remarkable particularly in a zoom objective which has a divergent zoom control member and is minimized in the complexity as in the present invention, so that the upper limit is a permissible limit of $N_{1\ convex}$ for the prevention of such a drawback. Further, Group I is provided with a cemented contact surface convex toward the front so as to have the principal point positioned rearward as much as possible and have the focal length shortened as much as possible while avoiding the mechanical interference with Group II, thereby to give an added advantage of minimizing the size of the complete objective. The internal contact may be separated without decreasing the optical effect.

In Group II, chromatic aberration correction is achieved and occurrence of aberrations of higher order is prevented provided that conditions (c) and (d) are simultaneously satisfied. When the limit of condition (c) is violated, the radius of curvature of the cemented surface which satisfies the achromatic condition should be increased with increases in aberrations of higher order, so that a good stabilization of aberrations with zooming is made difficult.

Condition (d) is concerned with the mean refractive index of materials of the negative lens elements. Group II has a large effect on aberration variation throughout the entire zooming range. Therefore, it is desirable to use glasses having as large refractive indices as possible in order to weaken the radii of curvature of the refracting surfaces. Particularly in this invention, the refractive power of Group II is strengthened according to condition (1) of the first features, so that from this point of view, a more careful selection of lens parameter $N_{2\ concave}$ is required. Condition (d) satisfies such requirement and decreases aberrations ascribable to the refracting surfaces, and prevents Petzval sum from decreasing too much. When the limit is violated, remarkable increases in various aberrations and too much decrease in Petzval sum bring about undesirable results.

In Group III, chromatic aberration correction is achieved provided that conditions (e) and (f) are simultaneously satisfied. When the limit of condition (e) is violated, the radius of curvature of the cemented contact surface which satisfies the achromatic condition is so large that spherical aberrations of higher order occur in an intermediate range of focal length positions. Condition (f) is concerned with the mean refractive index of the positive lens elements and correct appropriately Petzval sum. When the limit is violated, an over-correction of field curvature is effected.

Constructional data for two examples of one embodiment of the zoom lens system of the invention are given hereinbelow:

R: Radii of curvature of the successive refracting surfaces.
D: Axial thicknesses of the successive lens elements, or air spaces
N: Refractive indices (for $d$ line of spectrum) of glasses of the successive lens elements
V: Abbe numbers of glasses of the successive lens elements

EXAMPLE 1

$f = 85.0 - 232.83318 - 300.06782$
$M = 3.53$  F number = 4.5

$R_1 = 851.29000$
$\quad D_1 = 3.00 \quad N_1 = 1.71736 \quad V_1 = 29.51$
$R_2 = 134.70000$
$\quad D_2 = 8.40 \quad N_2 = 1.58913 \quad V_2 = 61.11$
$R_3 = -268.54000$
$\quad D_3 = 0.10$
$R_4 = 113.92000$
$\quad D_4 = 5.13 \quad N_3 = 1.58913 \quad V_3 = 61.11$
$R_5 = 333.43780$
$\quad D_5 = \text{Variable}$
$R_6 = -6363.20000$
$\quad D_6 = 1.50 \quad N_4 = 1.71300 \quad V_4 = 53.98$
$R_7 = 69.34600$
$\quad D_7 = 5.50$
$R_8 = -84.58200$
$\quad D_8 = 1.50 \quad N_5 = 1.71300 \quad V_5 = 53.98$
$R_9 = 68.95000$
$\quad D_9 = 3.85 \quad N_6 = 1.80518 \quad V_6 = 25.43$
$R_{10} = -862.78373$
$\quad D_{10} = \text{Variable}$
$R_{11} = 148.55000$
$\quad D_{11} = 4.79 \quad N_7 = 1.58913 \quad V_7 = 61.11$
$R_{12} = -100.85000$
$\quad D_{12} = 0.10$
$R_{13} = 121.40000$
$\quad D_{13} = 3.61 \quad N_8 = 1.58913 \quad V_8 = 61.11$
$R_{14} = -325.41000$
$\quad D_{14} = 0.10$
$R_{15} = 130.43000$
$\quad D_{15} = 5.93 \quad N_9 = 1.58913 \quad V_9 = 61.11$
$R_{16} = -81.76300$
$\quad D_{16} = 3.00 \quad N_{10} = 1.80518 \quad V_{10} = 25.43$
$R_{17} = 434.73656$
$\quad D_{17} = \text{Variable}$
$R_{18} = -76.89200$
$\quad D_{18} = 4.22 \quad N_{11} = 1.59270 \quad V_{11} = 35.29$
$R_{19} = -27.91100$
$\quad D_{19} = 1.40 \quad N_{12} = 1.63854 \quad V_{12} = 55.38$
$R_{20} = -2572.20000$
$\quad D_{20} = 4.99$
$R_{21} = 23.32800$
$\quad D_{21} = 4.66 \quad N_{13} = 1.58913 \quad V_{13} = 61.11$
$R_{22} = 37.16200$
$\quad D_{22} = 2.27$
$R_{23} = 109.00000$
$\quad D_{23} = 1.60 \quad N_{14} = 1.67003 \quad V_{14} = 47.25$
$R_{24} = 25.25600$
$\quad D_{24} = 5.72$
$R_{25} = -134.89000$
$\quad D_{25} = 3.50 \quad N_{15} = 1.51633 \quad V_{15} = 64.15$
$R_{26} = -35.31517$ Variable space

| $f$ | 85.0 | 232.83318 | 300.06782 |
|---|---|---|---|
| $D_5$ | 2.86247 | 55.07390 | 82.86247 |
| $D_{10}$ | 81.89916 | 16.08578 | 1.89916 |
| $D_{17}$ | 10.0 | 23.60195 | 10.0 |

$f_1 = 180.95861$
$f_2 = -59.40647 = -0.699 f_w$
$f_3 = 59.96206 = 0.954 \left(-f_2 + \dfrac{\sqrt{1/M}}{1+\sqrt{1/M}} e_{23}\right)$
$f_4 = -109.54327$
$f_5 = 333.84449$
$f_{45} = -169.60487$
$R_{4B} = -27.911 = -0.328 f_w$
$e_{23} = 10.0$
Total length = 273.47573

Seidel's aberration coefficients of EXAMPLE 1 at the shortest, intermediate and longest focal length positions are tabulated in the following tables.

| NO | Shortest focal length position | | | | |
|---|---|---|---|---|---|
| | I | II | III | P | V |
| 1 | 0.0002 | 0.0022 | 0.0201 | 0.0417 | 0.5622 |
| 2 | −0.0285 | −0.0028 | −0.0003 | −0.0296 | −0.0029 |
| 3 | 0.0440 | −0.1257 | 0.3594 | 0.1173 | −1.3631 |
| 4 | 0.0216 | 0.0201 | 0.0188 | 0.2766 | 0.2755 |
| 5 | 0.0108 | −0.0584 | 0.3170 | −0.0945 | −1.2075 |
| 6 | −0.0699 | 0.2036 | −0.5934 | −0.0056 | 1.7452 |
| 7 | −1.2094 | 0.0788 | −0.0051 | −0.5102 | 0.0336 |
| 8 | 0.0027 | −0.0064 | 0.0150 | −0.4183 | 0.9471 |
| 9 | 0.7050 | −0.2428 | 0.0836 | 0.0367 | −0.0415 |
| 10 | −0.3647 | −0.2266 | −0.1408 | 0.0439 | −0.0602 |
| 11 | 5.5422 | 0.8099 | 0.1183 | 0.2121 | 0.0483 |
| 12 | 7.4075 | −2.6326 | 0.9357 | 0.3125 | −0.4436 |
| 13 | −0.0775 | −0.0560 | −0.0405 | 0.2596 | 0.1583 |
| 14 | 10.3724 | −3.7065 | 1.3245 | 0.0968 | −0.5079 |
| 15 | −0.4057 | 0.4569 | −0.5146 | 0.2416 | 0.3075 |
| 16 | −16.1852 | 3.3361 | −0.6876 | −0.0783 | 0.1579 |
| 17 | 4.1009 | −2.0434 | 1.0182 | −0.0872 | −0.4639 |
| 18 | −25.1067 | 6.0499 | −1.4578 | −0.4114 | 0.4504 |
| 19 | −8.3212 | 0.9628 | −0.1114 | −0.0535 | 0.0191 |
| 20 | 0.2859 | −0.2932 | 0.3007 | 0.0129 | −0.3216 |
| 21 | 22.7893 | 3.7498 | 0.6170 | 1.3508 | 0.3238 |
| 22 | 0.6117 | 0.4978 | 0.4050 | −0.8480 | −0.3604 |
| 23 | −1.1924 | 0.9413 | −0.7431 | 0.3129 | 0.3396 |
| 24 | −21.8033 | −5.4521 | −1.3633 | −1.3503 | −0.6786 |
| 25 | −0.0488 | 0.0589 | −0.0711 | −0.2146 | 0.3447 |
| 26 | 23.2458 | −2.1662 | 0.2019 | 0.8196 | −0.0952 |
| Σ | 0.3267 | 0.1553 | 0.0060 | 0.0337 | 0.1668 |

| NO | Intermediate focal length position | | | | |
|---|---|---|---|---|---|
| | I | II | III | P | V |
| 1 | 0.0136 | 0.0128 | 0.0121 | 0.0417 | 0.0506 |
| 2 | −1.6025 | 0.4158 | −0.1079 | −0.0296 | 0.0357 |
| 3 | 2.4751 | −1.6177 | 1.0573 | 0.1173 | −0.7677 |
| 4 | 1.2142 | −0.1800 | 0.0267 | 0.2766 | −0.0450 |
| 5 | 0.6057 | −0.6032 | 0.6008 | −0.0945 | −0.5042 |
| 6 | −2.6998 | 1.7840 | −1.1789 | −0.0056 | 0.7827 |
| 7 | −9.0993 | 0.2655 | −0.0077 | −0.5102 | 0.0151 |
| 8 | −1.0189 | 0.5887 | −0.3402 | −0.4183 | 0.4382 |
| 9 | 7.0257 | −0.8754 | 0.1091 | 0.0367 | −0.0182 |
| 10 | −1.9418 | −0.5149 | −0.1366 | 0.0439 | −0.0246 |
| 11 | 14.3873 | 0.2673 | 0.0050 | 0.2121 | 0.0040 |
| 12 | 8.6300 | −3.0866 | 1.1039 | 0.3125 | −0.5066 |
| 13 | 0.0988 | 0.0298 | 0.0090 | 0.2596 | 0.0809 |
| 14 | 13.0067 | −4.6756 | 1.6807 | 0.0968 | −0.6390 |
| 15 | −0.1825 | 0.2770 | −0.4204 | 0.2416 | 0.2713 |
| 16 | −25.2842 | 5.7551 | −1.3100 | −0.0783 | 0.3160 |
| 17 | 4.3804 | −2.1961 | 1.1010 | −0.0872 | −0.5082 |
| 18 | −25.1031 | 6.0496 | −1.4579 | −0.4114 | 0.4505 |
| 19 | −8.3197 | 0.9627 | −0.1114 | −0.0535 | 0.0191 |
| 20 | 0.2859 | −0.2932 | 0.3007 | 0.0129 | −0.3216 |
| 21 | 22.7831 | 3.7492 | 0.6170 | 1.3508 | 0.3238 |
| 22 | 0.6116 | 0.4977 | 0.4050 | −0.8480 | −0.3604 |
| 23 | −1.1924 | 0.9413 | −0.7431 | 0.3129 | 0.3396 |
| 24 | −21.7970 | −5.4512 | −1.3633 | −1.3503 | −0.6786 |
| 25 | −0.0488 | 0.0589 | −0.0711 | −0.2146 | 0.3447 |
| 26 | 23.2415 | −2.1660 | 0.2019 | 0.8196 | −0.0952 |
| Σ | 0.4697 | −0.0044 | −0.0183 | 0.0337 | −0.9970 |

| NO | Longest focal length position | | | | |
|---|---|---|---|---|---|
| | I | II | III | P | V |
| 1 | 0.0376 | 0.0177 | 0.0083 | 0.0417 | 0.0235 |
| 2 | −4.4208 | 1.1166 | −0.2820 | −0.0296 | 0.0787 |
| 3 | 6.8279 | −3.3450 | 1.6387 | 0.1173 | −0.8603 |
| 4 | 3.3494 | −0.6218 | 0.1154 | 0.2766 | −0.0728 |
| 5 | 1.6709 | −1.1630 | 0.8094 | −0.0945 | −0.4976 |
| 6 | −5.6854 | 2.8099 | −1.3887 | −0.0056 | 0.6891 |
| 7 | −4.2273 | −0.3800 | −0.0342 | −0.5102 | −0.0489 |
| 8 | −3.0444 | 1.3439 | −0.5932 | −0.4183 | 0.4465 |
| 9 | 4.9404 | −0.1712 | 0.0059 | 0.0367 | −0.0015 |
| 10 | −0.5136 | −0.3276 | −0.2090 | 0.0439 | −0.1053 |
| 11 | 5.5422 | 0.8099 | 0.1183 | 0.2121 | 0.0483 |
| 12 | 7.4075 | −2.6326 | 0.9357 | 0.3125 | −0.4436 |
| 13 | −0.0775 | −0.0560 | −0.0405 | 0.2596 | 0.1583 |
| 14 | 10.3724 | −3.7065 | 1.3245 | 0.0968 | −0.5079 |
| 15 | −0.4057 | 0.4569 | −0.5146 | 0.2416 | 0.3075 |
| 16 | −16.1852 | 3.3361 | −0.6876 | −0.0783 | 0.1579 |
| 17 | 4.1009 | −2.0434 | 1.0182 | −0.0872 | −0.4639 |

-continued

| NO | I | Longest focal length position II | III | P | V |
|----|---|----|----|----|----|
| 18 | −25.1068 | 6.0499 | −1.4578 | −0.4114 | 0.4504 |
| 19 | −8.3212 | 0.9628 | −0.1114 | −0.0535 | 0.0191 |
| 20 | 0.2859 | −0.2932 | 0.3007 | 0.0129 | −0.3216 |
| 21 | 22.7893 | 3.7498 | 0.6170 | 1.3508 | 0.3238 |
| 22 | 0.6117 | 0.4978 | 0.4050 | −0.8480 | −0.3604 |
| 23 | −1.1924 | 0.9413 | −0.7431 | 0.3129 | 0.3396 |
| 24 | −21.8033 | −5.4521 | −1.3633 | −1.3503 | −0.6786 |
| 25 | −0.0488 | 0.0589 | −0.0711 | −0.2146 | 0.3447 |
| 26 | 23.2458 | −2.1662 | 0.2019 | 0.8196 | −0.0952 |
| Σ | 0.1496 | −0.2072 | 0.0024 | 0.0337 | −1.0701 |

EXAMPLE 2

$f = 85 - 232.83323 - 300.06782$
$M = 3.53$  F number = 4.5

$R_1 = 768.43000$
  $D_1 = 3.00$   $N_1 = 1.72151$   $V_1 = 29.24$
$R_2 = 135.54000$
  $D_2 = 8.50$   $N_2 = 1.58913$   $V_2 = 61.11$
$R_3 = -268.23000$
  $D_3$ 0.10
$R_4 = 112.94000$
  $D_4 = 4.91$   $N_3 = 1.58913$   $V_3 = 61.11$
$R_5 = 312.60436$
  $D_5 =$ Variable
$R_6 = \infty$
  $D_6 = 1.50$   $N_4 = 1.71300$   $V_4 = 53.98$
$R_7 = 69.03300$
  $D_7 = 5.50$
$R_8 = -83.73500$
  $D_8 = 1.50$   $N_5 = 1.71300$   $V_5 = 53.98$
$R_9 = 69.39000$
  $D_9 = 3.85$   $N_6 = 1.80518$   $V_6 = 25.43$
$R_{10} = -838.68202$
  $D_{10} =$ Variable
$R_{11} = 148.07000$
  $D_{11} = 4.76$   $N_7 = 1.58913$   $V_7 = 61.11$
$R_{12} = -102.58000$
  $D_{12} = 0.10$
$R_{13} = 125.38000$
  $D_{13} = 3.60$   $N_8 = 1.58913$   $V_8 = 61.11$
$R_{14} = -298.46000$
  $D_{14} = 0.10$
$R_{15} = 130.08000$
  $D_{15} = 6.03$   $N_9 = 1.58913$   $V_9 = 61.11$
$R_{16} = -81.15100$
  $D_{16} = 3.00$   $N_{10} = 1.80518$   $V_{10} = 25.43$
$R_{17} = 458.21296$
  $D_{17} =$ Variable
$R_{18} = -73.71600$
  $D_{18} = 3.90$   $N_{11} = 1.60342$   $V_{11} = 38.01$

EXAMPLE 2-continued $R_{19} = -27.18900$
  $D_{19} = 1.40$   $N_{12} = 1.64000$   $V_{12} = 60.25$
$R_{20} = -2064.30000$
  $D_{20} = 4.96$
$R_{21} = 22.98500$
  $D_{21} = 4.88$   $N_{13} = 1.58913$   $V_{13} = 61.11$
$R_{22} = 36.94700$
  $D_{22} = 1.81$
$R_{23} = 117.48000$
  $D_{23} = 1.60$   $N_{14} = 1.66892$   $V_{14} = 44.98$
$R_{24} = 25.00600$
  $D_{24} = 5.84$
$R_{25} = -152.69000$
  $D_{25} = 3.50$   $N_{15} = 1.51112$   $V_{15} = 60.48$
$R_{26} = -35.19362$
Variable space

| f | 85.0 | 232.83323 | 300.06783 |
|---|---|---|---|
| $D_5$ | 2.85720 | 55.06863 | 82.85720 |
| $D_{10}$ | 81.89398 | 16.08068 | 1.89398 |
| $D_{17}$ | 10.0 | 23.60195 | 10.0 |

$f_1 = 180.95861$
$f_2 = -59.40647 = 0.699 f_W$
$f_3 = 59.96206 = 0.954 \left( -f_2 + \dfrac{\sqrt{1/M}}{1 + \sqrt{1/M}} e_{23} \right)$
$f_4 = -108.23461$
$f_5 = 319.20976$
$f_{45} = -171.51457$
$R_{48} = -27.189 = -0.320 f_W$
$e_{23} = 10.0$
Total length = 273.87822

Seidel's aberration coefficients of Example 2 at the shortest, intermediate and longest focal length positions are tabulated in the following tables.

| NO | I | Shortest focal length position II | III | P | V |
|----|---|----|----|----|----|
| 1 | 0.0003 | 0.0027 | 0.0218 | 0.0464 | 0.5539 |
| 2 | −0.0280 | −0.0032 | −0.0004 | −0.0303 | −0.0035 |
| 3 | 0.0460 | −0.1303 | 0.3691 | 0.1175 | −1.3777 |
| 4 | 0.0208 | 0.0195 | 0.0182 | 0.2790 | 0.2785 |
| 5 | 0.0090 | −0.0525 | 0.3046 | −0.1008 | −1.1827 |
| 6 | −0.0656 | 0.1948 | −0.5790 | 0. | 1.7205 |
| 7 | −1.2044 | 0.0773 | −0.0050 | −0.5125 | 0.0332 |
| 8 | 0.0006 | −0.0014 | 0.0032 | −0.4225 | 0.9676 |
| 9 | 0.6976 | −0.2386 | 0.0816 | 0.0365 | −0.0404 |
| 10 | −0.3615 | −0.2268 | −0.1423 | 0.0452 | −0.0609 |
| 11 | 5.5655 | 0.8177 | 0.1201 | 0.2128 | 0.0489 |
| 12 | 7.0042 | −2.5123 | 0.9011 | 0.3072 | −0.4334 |
| 13 | −0.0717 | −0.0547 | −0.0417 | 0.2513 | 0.1598 |
| 14 | 10.6854 | −3.7694 | 1.3297 | 0.1056 | −0.5063 |
| 15 | −0.3766 | 0.4359 | −0.5045 | 0.2422 | 0.3035 |
| 16 | −16.2342 | 3.3214 | −0.6795 | −0.0789 | 0.1552 |
| 17 | 4.2116 | −2.0733 | 1.0207 | −0.0827 | −0.4617 |
| 18 | −26.6331 | 6.2757 | −1.4788 | −0.4339 | 0.4507 |
| 19 | −7.0304 | 0.7960 | −0.0901 | −0.0435 | 0.0151 |
| 20 | 0.2788 | −0.2868 | 0.2950 | 0.0161 | −0.3199 |
| 21 | 24.9483 | 3.9911 | 0.6385 | 1.3710 | 0.3215 |
| 22 | 0.6046 | 0.5042 | 0.4204 | −0.8529 | −0.3606 |
| 23 | −1.5006 | 1.0696 | −0.7623 | 0.2900 | 0.3367 |
| 24 | −24.2089 | −5.8236 | −1.4009 | −1.3624 | −0.6647 |
| 25 | −0.0165 | 0.0253 | −0.0390 | −0.1883 | −0.3493 |
| 26 | 23.9597 | −2.2122 | 0.2043 | 0.8169 | −0.0943 |
| Σ | 0.3010 | 0.1461 | 0.0049 | 0.0289 | 0.1881 |

Intermediate focal length position

| NO | I | II | III | P | V |
|---|---|---|---|---|---|
| 1 | 0.0186 | 0.0151 | 0.0122 | 0.0464 | 0.0476 |
| 2 | −1.5758 | 0.4040 | −0.1036 | −0.0303 | 0.0343 |
| 3 | 2.5917 | −1.6814 | 1.0909 | 0.1175 | −0.7839 |
| 4 | 1.1704 | −0.1715 | 0.0251 | 0.2790 | −0.0446 |
| 5 | 0.5093 | −0.5321 | 0.5559 | −0.1008 | −0.4755 |
| 6 | −2.5819 | 1.7232 | −1.1501 | 0. | 0.7676 |
| 7 | −9.0519 | 0.2534 | −0.0071 | −0.5125 | 0.0145 |
| 8 | −1.1067 | 0.6310 | −0.3598 | −0.4225 | 0.4461 |
| 9 | 6.9473 | −0.8542 | 0.1050 | 0.0365 | −0.0174 |
| 10 | −1.9196 | −0.5161 | −0.1387 | 0.0452 | −0.0251 |
| 11 | 14.4391 | 0.2826 | 0.0055 | 0.2128 | 0.0043 |
| 12 | 8.0868 | −2.9165 | 1.0518 | 0.3072 | −0.4901 |
| 13 | 0.0895 | 0.0284 | 0.0090 | 0.2513 | 0.0828 |
| 14 | 13.4446 | −4.7743 | 1.6954 | 0.1056 | −0.6395 |
| 15 | −0.1604 | 0.2562 | −0.4091 | 0.2422 | 0.2665 |
| 16 | −25.3659 | 5.7360 | −1.2971 | −0.0789 | 0.3112 |
| 17 | 4.5241 | −2.2392 | 1.1083 | −0.0827 | −0.5076 |
| 18 | −26.6292 | 6.2754 | −1.4788 | −0.4339 | 0.4508 |
| 19 | −7.0292 | 0.7959 | −0.0901 | −0.0435 | 0.0151 |
| 20 | 0.2788 | −0.2868 | 0.2950 | 0.0161 | −0.3199 |
| 21 | 24.9415 | 3.9905 | 0.6385 | 1.3710 | 0.3215 |
| 22 | 0.6045 | 0.5041 | 0.4204 | −0.8529 | −0.3607 |
| 23 | −1.5005 | 1.0695 | −0.7624 | 0.2900 | 0.3367 |
| 24 | −24.2020 | −5.8226 | −1.4008 | −1.3624 | −0.6648 |
| 25 | −0.0165 | 0.0254 | −0.0390 | −0.1883 | 0.3494 |
| 26 | 23.9553 | −2.2120 | 0.2043 | 0.8169 | −0.0943 |
| Σ | 0.4619 | −0.0159 | −0.0193 | 0.0289 | −0.9753 |

Longest focal length position

| NO | I | II | III | P | V |
|---|---|---|---|---|---|
| 1 | 0.0512 | 0.0201 | 0.0079 | 0.0464 | 0.0213 |
| 2 | −4.3471 | 1.0877 | −0.2722 | −0.0303 | 0.0757 |
| 3 | 7.1497 | −3.4782 | 1.6920 | 0.1175 | −0.8803 |
| 4 | 3.2287 | −0.5944 | 0.1094 | 0.2790 | −0.0715 |
| 5 | 1.4050 | −1.0185 | 0.7383 | −0.1008 | −0.4621 |
| 6 | −5.4933 | 2.7340 | −1.3607 | 0. | 0.6772 |
| 7 | −4.1953 | −0.3818 | −0.0348 | −0.5125 | −0.0498 |
| 8 | −3.2069 | 1.3980 | −0.6094 | −0.4225 | 0.4498 |
| 9 | 4.8815 | −0.1608 | 0.0053 | 0.0365 | −0.0014 |
| 10 | −0.5048 | −0.3256 | −0.2101 | 0.0452 | −0.1063 |
| 11 | 5.5655 | 0.8177 | 0.1201 | 0.2128 | 0.0489 |
| 12 | 7.0042 | −2.5123 | 0.9011 | 0.3072 | −0.4334 |
| 13 | −0.0717 | −0.0547 | −0.0417 | 0.2513 | 0.1598 |
| 14 | 10.6854 | −3.7694 | 1.3297 | 0.1056 | −0.5063 |
| 15 | −0.3766 | 0.4359 | −0.5045 | 0.2422 | 0.3035 |
| 16 | −16.2342 | 3.3214 | −0.6795 | −0.0789 | 0.1552 |
| 17 | 4.2116 | −2.0733 | 1.0207 | −0.0827 | −0.4617 |
| 18 | −26.6331 | 6.2757 | −1.4788 | −0.4339 | 0.4507 |
| 19 | −7.0304 | 0.7960 | −0.0901 | −0.0435 | 0.0151 |
| 20 | 0.2788 | −0.2868 | 0.2950 | 0.0161 | −0.3199 |
| 21 | 24.9483 | 3.9912 | 0.6385 | 1.3710 | 0.3215 |
| 22 | 0.6046 | 0.5042 | 0.4204 | −0.8529 | −0.3606 |
| 23 | −1.5006 | 1.0696 | −0.7623 | 0.2900 | 0.3367 |
| 24 | −24.2089 | −5.8236 | −1.4009 | −1.3624 | −0.6647 |
| 25 | −0.0165 | 0.0253 | −0.0390 | −0.1883 | 0.3493 |
| 26 | 23.9597 | −2.2122 | 0.2043 | 0.8169 | −0.0943 |
| Σ | 0.1549 | −0.2147 | −0.0013 | 0.0289 | −1.0476 |

FIGS. 2A1, 2A2, 2A3, 2B1, 2B2, 2B3, 2C1, 2C2 and 2C3, illustrate the state of correction of the image aberrations in Example 1 at the shortest, intermediate and longest focal length positions, while FIGS. 3A1, 3A2, 3A3, 3B1, 3B2, 3B3, 3C1, 3C2 and 3C3 illustrate the state of correction of the image aberrations in Example 2 at the shortest, intermediate and longest focal length positions. It is apparent from the aberration curves, that whilst the provision of a high relative aperture, large magnification ratio and compact structure is made in a zoom lens usable with a still camera, nevertheless a hgih standard of stabilization of various aberrations is effected throughout the entire zooming range.

What is claimed is:

1. An optical objective of the zoom type comprising five lens groups of which the first, third, and fifth groups are convergent, the second group is divergent, and the fourth group is a divergent doublet consisting of convergent and divergent elements cemented together, the cemented contact surface being concave toward the front, in which the second group is axially movable to effect magnification variation, and the third group is axially movable forward and then rearward when zooming the second group from one extreme focal length range to the other, said zoom lens system being characterized by the following simultaneously applied relationships:

(1) $0.6 f_w < -f_2 < 0.8 f_w$;

$$0.8\left(-f_2 + \frac{\sqrt{1/M}}{1 + \sqrt{1/M}} e_{23}\right) < f_3 \leq \left(f_2 + \frac{\sqrt{1/M}}{1 + \sqrt{1/M}} e_{23}\right) \quad 2.$$

(3); the Abbe number of the concave lens of the fourth group being larger than that of the convex lens of the fourth group.

(4) $0.01 < N_{4\ concave} - N_{4\ convex} < 0.08$;

(5) $0.3 f_w < -R_{4B} < 0.4 f_w$ where $f_w$ is the shortest focal length; $f_T$ is the longest focal length; M is the magnification ratio $f_T/f_w$; $f_i$ is the focal length of the $i^{th}$ lens group; $e_{23}$ is the minimum principal point interval between the second and third groups; $R_{4B}$ is the radius of curvature of the cemented contact surface in the fourth group; $N_{4\ convex}$ is the refractive index for the d line of the spectrum of concave lens in the fourth group; and $N_{4\ concave}$ is the refractive index for the d line of the spectrum of the concave lens in the fourth group; wherein the overall focal distance from the first group to the third group is a positive value and shorter than the focal distance of the entire system, wherein the overall focal distance between the fourth group and the fifth group is a negative value, and wherein a telephoto type optical system is formed with the whole groups.

2. An optical objective of the zoom type comprising five lens groups of which the first, third, and fifth groups are convergent, the second group is divergent, and the fourth group is a divergent doublet consisting of convergent and divergent elements cemented together, the cemented contact surface being concave toward the front, in which the second group is axially movable to effect magnification variation, and the third group is axially movable forward and then rearward when zooming the second group from one extreme focal length range to the other, said zoom lens system being characterized by the following simultaneously applied relationships:

(1) $0.6 f_w < -f_2 < 0.8 f_w$;

(2) $0.8 \left(-f_2 + \dfrac{\sqrt{1/M}}{1+\sqrt{1/M}} e_{23}\right) < f_3 \leq \left(-f_2 + \dfrac{\sqrt{1/M}}{1+\sqrt{1/M}} e_{23}\right)$;

(3) $15 < V_{4\ concave} - V_{4\ convex}$, said fourth group being formed with ordinary optical glasses having an Abbe number from 25 to 70;

(4) $0.01 < N_{4\ concave} - N_{4\ convex} < 0.08$;

(5) $0.3 f_w < -R_{4B} < 0.4 f_w$ where $f_w$ is the shortest focal length; $f_T$ is the longest focal length; M is the magnification ratio $f_T/f_w$; $f_i$ is the focal length of the $i^{th}$ lens group; $e_{23}$ is the minimum principal point interval between the second and third groups; $R_{4B}$ is the radius of curvature of the cemented contact surface in the fourth group; $V_{4\ convex}$ is the Abbe number of the convex lens in the fourth group; $V_{4\ concave}$ is the Abbe number of the concave lens in the fourth group; $N_{4\ convex}$ is the refractive index for the d line of the spectrum of the concave lens in the fourth group; and $N_{4\ concave}$ is the refractive index for the d line of the spectrum of the concave lens in the fourth group; wherein the overall focal distance from the first group to the third group is a positive value and shorter than the focal distance of the entire system, wherein the overall focal distance between the fourth group and the fifth group is a negative value, and wherein a telephoto type optical system is formed with the whole groups and wherein said optical system has substantially the following values:

$f = 85.0 - 232.83318 - 300.06782$
$M = 3.53 \quad F\ number = 4.5$

| | | | |
|---|---|---|---|
| $R_1 = 851.29000$ | | | |
| | $D_1 = 3.00$ | $N_1 = 1.71736$ | $V_1 = 29.51$ |
| $R_2 = 134.70000$ | | | |
| | $D_2 = 8.40$ | $N_2 = 1.58913$ | $V_2 = 61.11$ |
| $R_3 = -268.54000$ | | | |
| | $D_3 = 0.10$ | | |
| $R_4 = 113.92000$ | | | |
| | $D_4 = 5.13$ | $N_3 = 1.58913$ | $V_3 = 61.11$ |
| $R_5 = 333.43780$ | | | |
| | $D_5 =$ Variable | | |
| $R_6 = -6363.20000$ | | | |
| | $D_6 = 1.50$ | $N_4 = 1.71300$ | $V_4 = 53.98$ |
| $R_7 = 69.34600$ | | | |
| | $D_7 = 5.50$ | | |
| $R_8 = -84.58200$ | | | |
| | $D_8 = 1.50$ | $N_5 = 1.71300$ | $V_5 = 53.98$ |
| $R_9 = 68.95000$ | | | |
| | $D_9 = 3.85$ | $N_6 = 1.80518$ | $V_6 = 25.43$ |
| $R_{10} = -862.78373$ | | | |
| | $D_{10} =$ Variable | | |
| $R_{11} = 148.55000$ | | | |
| | $D_{11} = 4.79$ | $N_7 = 1.58913$ | $V_7 = 61.11$ |
| $R_{12} = -100.85000$ | | | |
| | $D_{12} = 0.10$ | | |
| $R_{13} = 121.40000$ | | | |
| | $D_{13} = 3.61$ | $N_8 = 1.58913$ | $V_8 = 61.11$ |
| $R_{14} = -325.41000$ | | | |
| | $D_{14} = 0.10$ | | |
| $R_{15} = 130.43000$ | | | |
| | $D_{15} = 5.93$ | $N_9 = 1.58913$ | $V_9 = 61.11$ |
| $R_{16} = -81.76300$ | | | |
| | $D_{16} = 3.00$ | $N_{10} = 1.80518$ | $V_{10} = 25.43$ |
| $R_{17} = 434.73656$ | | | |
| | $D_{17} =$ Variable | | |
| $R_{18} = -76.89200$ | | | |
| | $D_{18} = 4.22$ | $N_{11} = 1.59270$ | $V_{11} = 35.29$ |
| $R_{19} = -27.91100$ | | | |
| | $D_{19} = 1.40$ | $N_{12} = 1.63854$ | $V_{12} = 55.38$ |
| $R_{20} = -2572.20000$ | | | |
| | $D_{20} = 4.99$ | | |
| $R_{21} = 23.32800$ | | | |
| | $D_{21} = 4.66$ | $N_{13} = 1.58913$ | $V_{13} = 61.11$ |
| $R_{22} = 37.16200$ | | | |
| | $D_{22} = 2.27$ | | |
| $R_{23} = 109.00000$ | | | |
| | $D_{23} = 1.60$ | $N_{14} = 1.67003$ | $V_{14} = 47.25$ |
| $R_{24} = 25.25600$ | | | |
| | $D_{24} = 5.72$ | | |
| $R_{25} = -134.89000$ | | | |
| | $D_{25} = 3.50$ | $N_{15} = 1.51633$ | $V_{15} = 64.15$ |
| $R_{26} = -35.31517$ | | | |
| | Variable space | | |

| | | | |
|---|---|---|---|
| $f$ | 85.0 | 232.83318 | 300.06782 |
| $D_5$ | 2.86247 | 55.07390 | 82.86247 |
| $D_{10}$ | 81.89916 | 16.08578 | 1.89916 |
| $D_{17}$ | 10.0 | 23.60195 | 10.0 |

$f_1 = 180.95861$
$f_2 = -59.40647 = -0.699 f_w$
$f_3 = 59.96206 = 0.954 \left(-f_2 + \dfrac{\sqrt{1/M}}{1+\sqrt{1/M}} e_{23}\right)$
$f_4 = -109.54327$
$f_5 = 333.84449$
$f_{45} = -169.60487$
$R_{4B} = -27.911 = -0.328 f_w$
$e_{23} = 10.0$
Total length = 273.47573.

3. An optical objective of the zoom type comprising five lens groups of which the first, third, and fifth groups are convergent, the second group is divergent, and the fourth group is a divergent doublet consisting of convergent and divergent elements cemented together, the cemented contact surface being concave toward the front, in which the second group is axially movable to effect magnification variation, and the third group is axially movable forward and then rearward when zooming the second group from one extreme focal length range to the other, said zoom lens system being characterized by the following simultaneously applied relationships:

(1) $0.6 f_w < -f_2 < 0.8 f_w$;

(2) $0.8 \left(-f_2 + \dfrac{\sqrt{1/M}}{1+\sqrt{1/M}} e_{23}\right) < f_3 \leq \left(-f_2 + \dfrac{\sqrt{1/M}}{1+\sqrt{1/M}} e_{23}\right)$;

(3) $15 < V_{4\ concave} - V_{4\ convex}$, said fourth group being formed with ordinary optical glasses having an Abbe number from 25 to 70;

(4) $0.01 < N_{4\ concave} - N_{4\ convex} < 0.08$;

(5) $0.3 f_w < -R_{4B} < 0.4 f_w$ where $f_w$ is the shortest focal length; $f_T$ is the longest focal length; M is the magnification ratio $f_T/f_w$; $f_i$ is the focal length of the $i^{th}$ lens group; $e_{23}$ is the minimum principal point interval between the second and third groups; $R_{4B}$ is the radius of curvature of the cemented contact surface in the fourth group; $V_{4\ convex}$ is the Abbe number of the convex lens in the fourth group; $V_{4\ concave}$ is the Abbe number of the concave lens in the fourth group; $N_{4\ convex}$ is the refractive index for the $d$ line of the spectrum of the concave lens in the fourth group; and $N_{4\ concave}$ is the refractive index for the $d$ line of the spectrum of the concave lens in the fourth group; wherein the overall focal distance from the first group to the third group is a positive value and shorter than the focal distance of the entire system, wherein the overall focal distance between the fourth group and the fifth group is a negative value, and wherein a telephoto type optical system is formed with the whole groups and wherein said optical system has substantially the following values:

$f = 85 - 232.83323 - 300.06782$
$M = 3.53$   F number = 4.5

| | | |
|---|---|---|
| $R_1 = 768.43000$ | | |
| $D_1 = 3.00$ | $N_1 = 1.72151$ | $V_1 = 29.24$ |
| $R_2 = 135.54000$ | | |
| $D_2 = 8.50$ | $N_2 = 1.58913$ | $V_2 = 61.11$ |
| $R_3 = -268.23000$ | | |
| $D_3 = 0.10$ | | |
| $R_4 = 112.94000$ | | |
| $D_4 = 4.91$ | $N_3 = 1.58913$ | $V_3 = 61.11$ |
| $R_5 = 312.60436$ | | |
| $D_5 = $ Variable | | |
| $R_6 = \infty$ | | |
| $D_6 = 1.50$ | $N_4 = 1.71300$ | $V_4 = 53.98$ |
| $R_7 = 69.03300$ | | |
| $D_7 = 5.50$ | | |
| $R_8 = -83.73500$ | | |
| $D_8 = 1.50$ | $N_5 = 1.71300$ | $V_5 = 53.98$ |
| $R_9 = 69.39000$ | | |
| $D_9 = 3.85$ | $N_6 = 1.80518$ | $V_6 = 25.43$ |
| $R_{10} = -838.68202$ | | |
| $D_{10} = $ Variable | | |
| $R_{11} = 148.07000$ | | |
| $D_{11} = 4.76$ | $N_7 = 1.58913$ | $V_7 = 61.11$ |
| $R_{12} = -102.58000$ | | |
| $D_{12} = 0.10$ | | |
| $R_{13} = 125.38000$ | | |
| $D_{13} = 3.60$ | $N_8 = 1.58913$ | $V_8 = 61.11$ |
| $R_{14} = -298.46000$ | | |
| $D_{14} = 0.10$ | | |
| $R_{15} = 130.08000$ | | |
| $D_{15} = 6.03$ | $N_9 = 1.58913$ | $V_9 = 61.11$ |
| $R_{16} = -81.15100$ | | |
| $D_{16} = 3.00$ | $N_{10} = 1.80518$ | $V_{10} = 25.43$ |
| $R_{17} = 458.21296$ | | |
| $D_{17} = $ Variable | | |
| $R_{18} = -73.71600$ | | |
| $D_{18} = 3.90$ | $N_{11} = 1.60342$ | $V_{11} = 38.01$ |
| $R_{19} = -27.18900$ | | |
| $D_{19} = 1.40$ | $N_{12} = 1.64000$ | $V_{12} = 60.25$ |
| $R_{20} = -2064.30000$ | | |
| $D_{20} = 4.96$ | | |
| $R_{21} = 22.98500$ | | |
| $D_{21} = 4.88$ | $N_{13} = 1.58913$ | $V_{13} = 61.11$ |
| $R_{22} = 36.94700$ | | |
| $D_{22} = 1.81$ | | |
| $R_{23} = 117.48000$ | | |
| $D_{23} = 1.60$ | $N_{14} = 1.66892$ | $V_{14} = 44.98$ |
| $R_{24} = 25.00600$ | | |
| $D_{24} = 5.84$ | | |
| $R_{25} = -152.69000$ | | |
| $D_{25} = 3.50$ | $N_{15} = 1.51112$ | $V_{15} = 60.48$ |
| $R_{26} = -35.19362$ | | |

Variable space

| f | 85.0 | 232.83323 | 300.06783 |
|---|---|---|---|
| $D_5$ | 2.85720 | 55.06863 | 82.85720 |
| $D_{10}$ | 81.89398 | 16.08068 | 1.89398 |
| $D_{17}$ | 10.0 | 23.60195 | 10.0 |

$f_1 = 180.95861$
$f_2 = -59.40647 = 0.699 f_w$
$f_3 = 59.96206 = 0.954 \left(-f_2 + \dfrac{\sqrt{1/M}}{1+\sqrt{1/M}} e_{23}\right)$
$f_4 = -108.23461$
$f_5 = 319.20976$
$f_{45} = -171.51457$
$R_{4B} = -27.189 = -0.320 f_w$
$e_{23} = 10.0$
Total length = 273.87822.

4. An optical objective of the zoom type comprising: five lens groups of which the first, third, and fifth groups are convergent, the second group is divergent, and the fourth group is a divergent doublet consisting of a meniscus convex lens and concave lens cemented together, the cemented contact surface being concave toward the front, the fifth group including a meniscus convex lens with its convex face directed to the object, a meniscus concave lens with its concave face directed to the image and a meniscus convex lens with its convex face directed to the image, in which the second group is axially movable to effect magnification variation, and the third group is axially movable forward and then rearward when zooming the second group from one extreme focal length range to the other.

* * * * *

UNITED STATES PATENT OFFICE
CERTIFICATE OF CORRECTION

Patent No. 3970367      Dated July 20, 1976

Inventor(s) Sadahiko Tsuji

It is certified that error appears in the above-identified patent and that said Letters Patent are hereby corrected as shown below:

In the heading of the Patent [30] should read as follows:

--[30] Foreign Application Priority Data

July 20, 1972 Japan......... 47-72032--.

Signed and Sealed this

Twenty-second Day of March 1977

[SEAL]

Attest:

RUTH C. MASON
Attesting Officer

C. MARSHALL DANN
Commissioner of Patents and Trademarks